(12) United States Patent
Watanabe et al.

(10) Patent No.: US 7,179,098 B2
(45) Date of Patent: Feb. 20, 2007

(54) TERMINAL AND PORTABLE DEVICE USING THE SAME

(75) Inventors: Takaaki Watanabe, Kanagawa (JP); Masato Yamazaki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/912,404

(22) Filed: Aug. 4, 2004

(65) Prior Publication Data

US 2005/0112917 A1    May 26, 2005

(30) Foreign Application Priority Data

Aug. 7, 2003   (JP)   ............ P.2003-289261

(51) Int. Cl.
*H05K 1/00* (2006.01)
(52) U.S. Cl. ............................... 439/79; 439/946
(58) Field of Classification Search .......... 439/79, 439/80, 76.1, 289
See application file for complete search history.

(56) References Cited

U.S. PATENT DOCUMENTS

| | | | | |
|---|---|---|---|---|
| 3,529,213 A | * | 9/1970 | Farrand et al. | 361/730 |
| 3,550,062 A | * | 12/1970 | Drenten et al. | 439/64 |
| 5,234,353 A | * | 8/1993 | Scholz et al. | 439/289 |
| 5,812,660 A | * | 9/1998 | Suzuki et al. | 379/438 |
| 5,865,648 A | * | 2/1999 | Clyatt, III | 439/620 |
| 5,931,683 A | * | 8/1999 | Pinel | 439/39 |
| 6,053,763 A | * | 4/2000 | Brennan et al. | 439/491 |
| 6,227,872 B1 | * | 5/2001 | Stephenson et al. | 439/76.1 |
| 6,322,396 B1 | * | 11/2001 | Kuan | 439/607 |
| 6,511,329 B2 | * | 1/2003 | Yi-Tsung | 439/76.1 |
| 2004/0253859 A1 | * | 12/2004 | Hirata et al. | 439/181 |

FOREIGN PATENT DOCUMENTS

| | | | |
|---|---|---|---|
| JP | 2000-332869 | * | 11/2000 |
| JP | 2001-127863 | | 5/2001 |
| JP | 2003-308884 | | 10/2003 |

* cited by examiner

*Primary Examiner*—Neil Abrams
(74) *Attorney, Agent, or Firm*—Hogan & Hartson LLP (57) ABSTRACT

A terminal includes a base portion having a mounting portion to be mounted on a circuit board and an extended portion extending from one end portion of the mounting portion toward the mounting surface side of the circuit board, and a terminal portion made of a conductive material and formed to extend from an front surface of the extended portion which is flush with one end face of the mounting portion through a mounting side surface of the mounting portion. The terminal is mounted on the circuit board such that the mounting side surface of the terminal is abutted on a mounting surface of the circuit board, and the extended portion is projected toward a surface side of the circuit board which is located away from its mounting surface, so as to configure a portable device.

12 Claims, 6 Drawing Sheets

TERMINAL AND PORTABLE DEVICE USING THE SAME

BACKGROUND OF THE INVENTION

1. Field of the Invention

The present invention relates to a terminal connected to an external connection apparatus such as a charger, and to a portable device such as a portable telephone, a PDA (Portable Digital Assistant), a laptop computer, or the like using the same.

2. Description of the Related Art

Conventionally, a portable device such as a portable telephone, a PDA, and a laptop computer has power supply terminals on an opening side of a housing configuring the portable device in order to charge a battery provided in its interior with a charger. The power supply terminals are abutted on electrodes of the charger so as to supply electric power to the battery.

Figure 9:
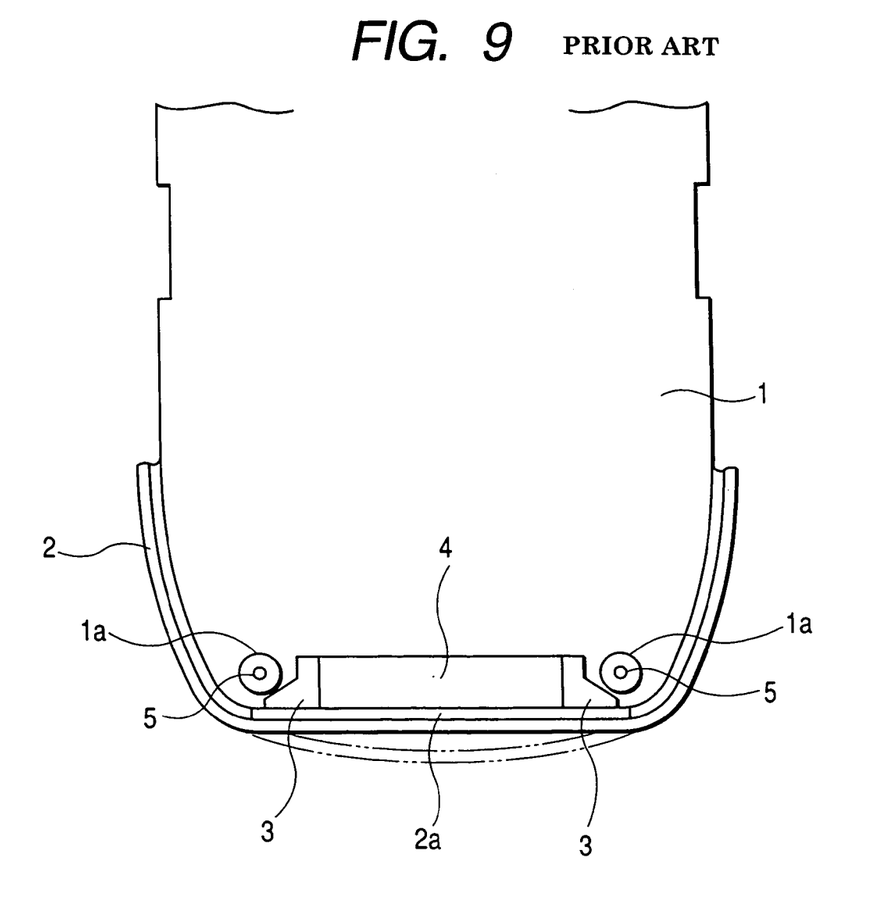
FIG. 9 is a plan view illustrating a state in which a conventional integral terminal and interface connector are mounted on a circuit board and accommodated in a housing.
Figure 10:
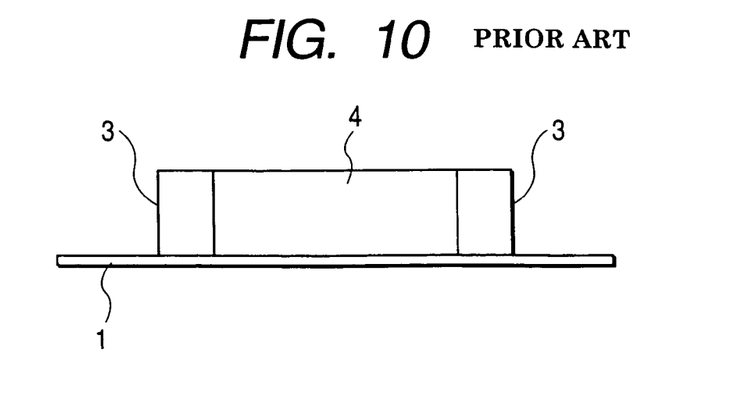
FIG. 10 is a front elevational view of the board with the terminal and the interface connector mounted thereon, the housing shown in FIG. 8 being shown in a cross section.

FIGS. 9 and 10 shows an example of conventional power supply terminals. Pair of terminals 3 are configured integrally with an interface connector 4. In FIGS. 9 and 10, reference numeral 1 denotes a circuit board accommodated in a housing 2 of the portable device. The interface connector 4 is disposed in the center of one end side of the circuit board 1. The pair of terminals 3 are formed on the circuit board 1 integrally with the interface connector 4 so as to be respectively located on both left and right sides of the interface connector 4. The terminals 3 are disposed so as to expose from an opening 2a of the housing 2. Bosses 5 are provided on a lower cover 2a so as to join an upper cover and the lower cover 2a configuring the housing 2 by means of screws. As the boss 5 is inserted in a hole 1a formed in the circuit board 1, the circuit board 1 is positioned within the lower cover 2a.

In order to charge an unillustrated battery provided in the portable device, the terminals 3 of the portable device are come into contact with the electrodes of the charger.

Figure 11:
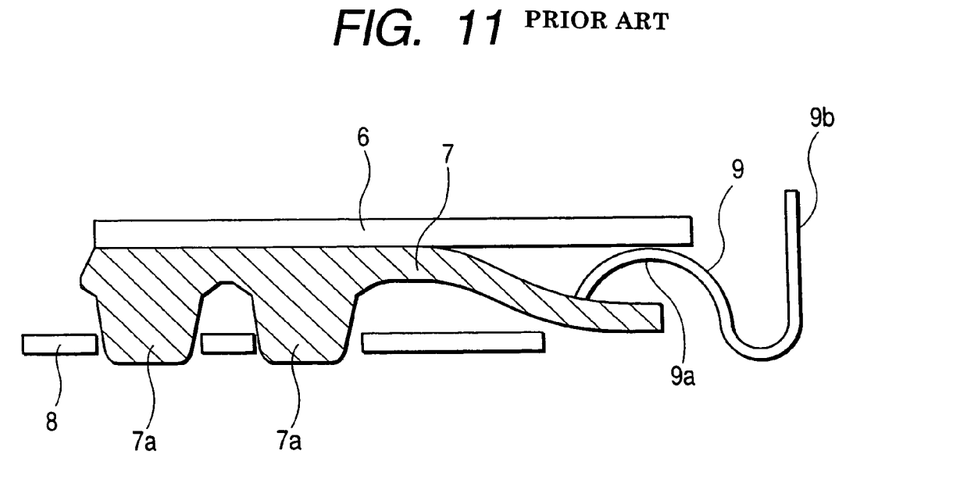
FIG. 11 is a cross-sectional view of a portable device illustrating another example of the conventional terminal.

FIG. 11 shows another example of conventional power supply terminals. In FIG. 11, reference numeral 6 denotes a circuit board accommodated in a housing of an unillustrated portable device; reference numeral 7 denotes a key top attached to a side of the circuit board 6 serving as an outer side of the housing; reference numeral 8 denotes a panel assembly; reference numeral 9 denotes a leaf spring-type terminal inserted in a fitting hole of the panel assembly 8 such that a top of a semicircular portion 9a is brought into contact with a conductor formed on the circuit board 6; and reference numeral 7a denotes a holder of the key top 7. In FIG. 11, in order to charge the battery, a vertical surface 9b of the terminal 9 is brought into contact with an electrode of the charger.

JP-A-2001-127863 is referred to as a related art.

The terminals 3 shown in FIGS. 9 and 10 are formed on the circuit board 1 integrally with the interface connector 4, and further the terminals 3 and a front end face of the interface connector 4 facing the opening 2a are flush with each other. Therefore, the position where each terminal 3 is disposed is restricted, and further the shape of the housing 2 on the side where the terminals 3 are disposed is restricted. For this reason, the flexibility in designing the portable device is low. Further, since the terminals 3 are bilaterally symmetrical, identical parts cannot be used for the left and right parts. As a result, variety of terminals 3 increases.

On the other hand, since the terminal 9 shown in FIG. 11 is of the leaf spring type, the terminal 9 must be disposed such that its vertical surface 9b becomes orthogonal to the circuit board 6. For this reason, the position where the terminal 9 is disposed is restricted, and the terminal 9 is easily deformed when the terminal 9 is pressed against the electrode of the charge. In addition, even though such terminals are used for a portable device, charging may not be effected with reliability. Thus there is a problem in reliability.

SUMMARY OF THE INVENTION

The invention provides a terminal to be mounted in an opening of a portable device, having: a base portion including a mounting portion to be mounted on a circuit board disposed in the portable device, and an extended portion extending from one end portion of the mounting portion toward a mounting surface side of the circuit board and having a front surface which is flush with one end face of the mounting portion; and a terminal portion possessing electrical conductivity and attached to the base portion from at least the front surface of the extended portion through a mounting surface of the mounting portion.

The invention also provides a portable device having: a housing having an opening in one face thereof; a circuit board disposed in the housing; and a terminal mounted on the circuit board and exposed from the opening, wherein the terminal includes: a base portion including a mounting portion mounted on the circuit board, and an extended portion extending from one end portion of the mounting portion toward a mounting surface side of the circuit board and having a front surface which is flush with one end face of the mounting portion; and a terminal portion possessing electrical conductivity and attached to the base portion from at least the front surface of the extended portion through a mounting surface of the mounting portion, the terminal is mounted on the circuit board such that a mounting surface of the terminal is abutted on a mounting surface of the circuit board, and the extended portion is projected toward a surface side opposite to the mounting surface of the circuit board.

Furthermore, a surface, of one end portion of the housing, opposing the mounting surface of the circuit board is shaped to be tapered toward one end face of the housing.

The invention also provides a terminal having: a base portion including a mounting portion having a mounting surface to be mounted on a circuit board, and an extended portion extending from one end portion of the mounting portion toward a side of the mounting surface and having a front surface which forms a same surface as one end face of the mounting portion; and a terminal portion possessing electrical conductivity and attached to the base portion from at least the front surface of the extended portion through a mounting surface of the mounting portion.

Furthermore, the mounting portion has branch portions at each corner of another end portion of the mounting portion, and the mounting portion is formed substantially in a Y-shape in a plane view.

Furthermore, the terminal is formed in a symmetrical shape.

The invention also provides a portable device having: a housing having an opening in one face thereof; a circuit board disposed in the housing; and a terminal mounted on the circuit board and exposed from the opening, wherein the terminal includes: a base portion including a mounting portion having a mounting surface to be mounted on the circuit board, and an extended portion extending to be projected from one end portion of the mounting portion toward a side of the mounting surface and having a front surface which forms a same surface as one end face of the mounting portion; and a terminal portion possessing electrical conductivity and attached to the base portion from at least the front surface of the extended portion through a mounting surface of the mounting portion, the terminal is mounted on the circuit board such that the mounting surface of the terminal is abutted on a mounting surface provided at an edge portion of the circuit board, and the extended portion of the terminal is projected toward a surface side opposite to the mounting surface of the circuit board.

Furthermore, a surface of the terminal disposed on a surface formed from the one end portion of the mounting portion and the front surface of the extended portion is exposed from the opening.

Furthermore, a surface, of one portion of the housing, opposing the mounting surface of the circuit board is shaped to be tapered toward one end face of the housing.

Furthermore, the mounting portion has branch portions at each corner of another end portion of the mounting portion, and a boss of the housing is disposed between the branch portions.

Furthermore, the terminal is formed in a symmetrical shape.

According to the invention, the position where the terminal is disposed is less restricted, flexibility in designing the portable device is high, and further the terminal can be commonly used as the left and right parts. If the terminal is used in a portable device, it is possible to make parts common and lower the cost. Further, it is possible to prevent the terminal from being broken or deformed by a pressing force applied thereto at the time of electrical connection to an external device as in the case of charging with a charger. As a result, stable energization can be effected constantly.

DETAILED DESCRIPTION OF THE PREFERRED EMBODIMENTS

An embodiment of the invention will be described below.

Figure 1:
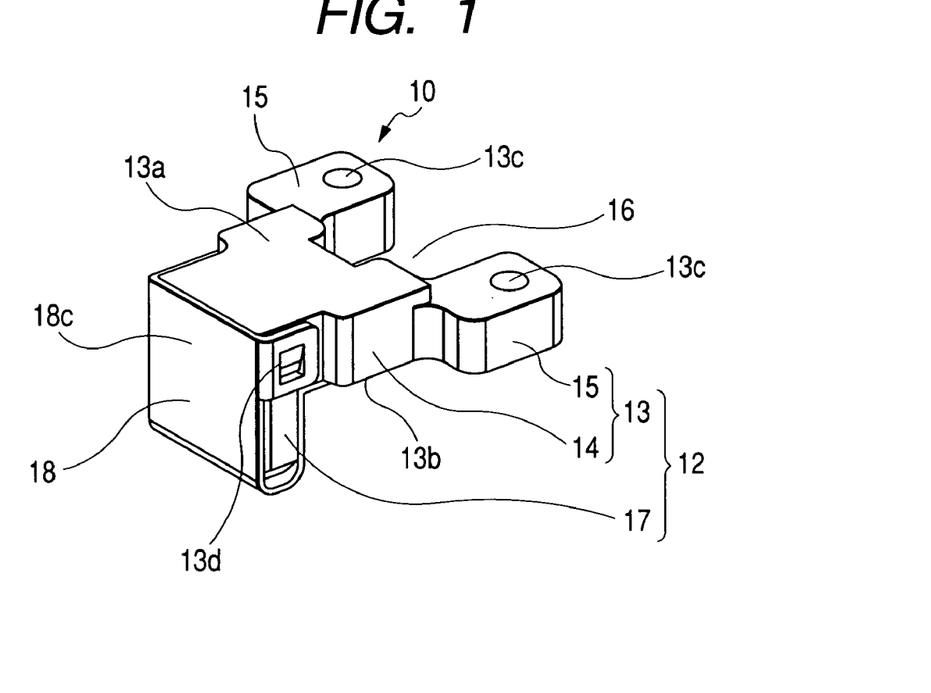
FIG. 1 is a perspective view illustrating an embodiment of a terminal in accordance with the invention.
Figure 2:
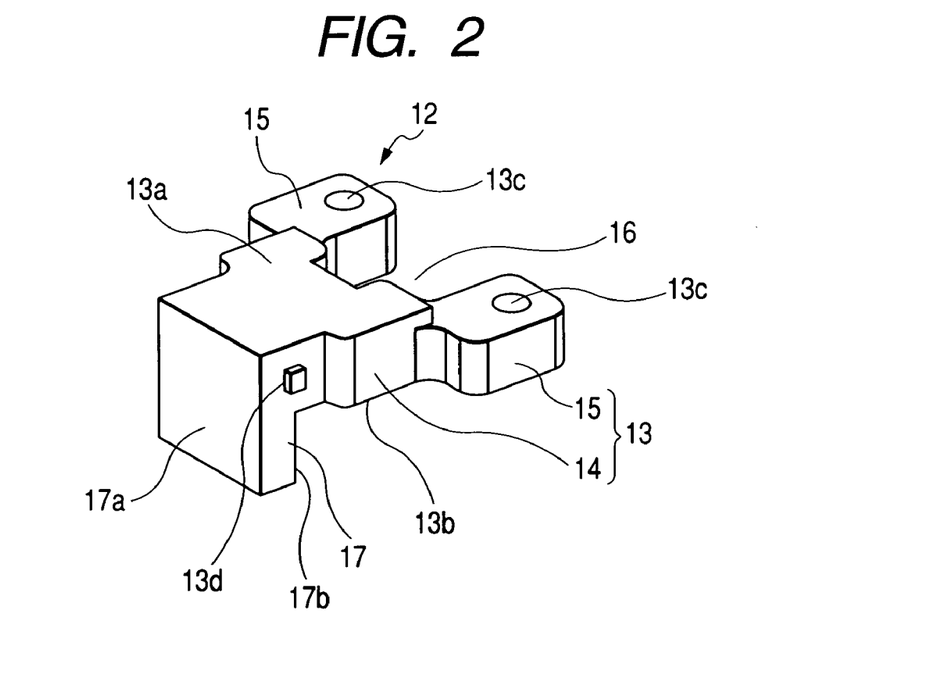
FIG. 2 is a perspective view illustrating a base portion for making up the terminal shown in FIG. 1.
Figure 3:
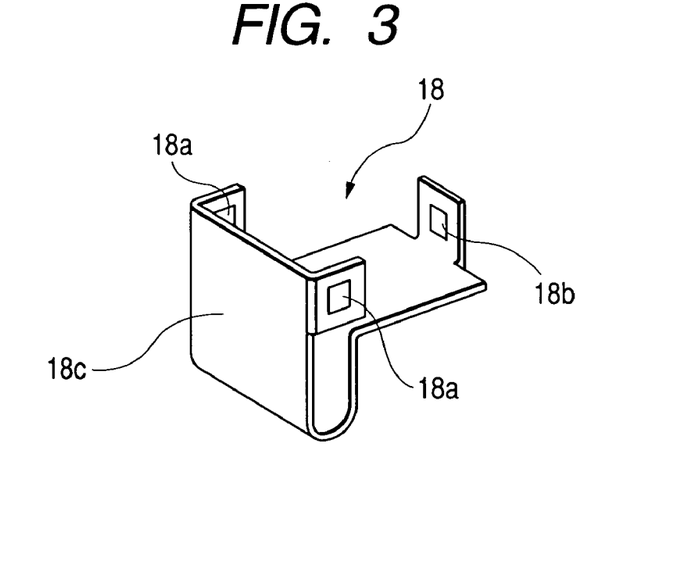
FIG. 3 is a perspective view illustrating a terminal portion for making up the terminal shown in FIG. 1.

FIG. 1 is a perspective view illustrating an embodiment of a terminal in accordance with the invention. FIG. 2 is a perspective view illustrating a base portion for configuring the terminal shown in FIG. 1. FIG. 3 is a perspective view illustrating a terminal portion for configuring the terminal shown in FIG. 1.

A terminal 10 shown in FIGS. 1 to 3 includes a base portion 12 made of a nonconductive material such as a resin, a plastic or the like, a terminal portion 18 made of a conductive material such as a metal. The base portion 12 has a mounting portion 13 to be mounted on a circuit board and an extended portion 17 extending from one end portion of the mounting portion 13 toward a mounting surface side of the circuit board. The terminal 10 is formed in a symmetrical shape.

As shown in FIG. 2, the mounting portion 13 has a trunk portion 14 and two branch portions 15 extending from corners of the other end of the trunk portion 14. The mounting portion 13 is formed substantially in a Y-shape in a plan view. A recessed portion 16 is formed between the two branch portions 15 and the trunk portion 14.

A pin hole 13c for insertion of a pin which fixes the mounting portion 13 to the circuit board is bored in each branch portion 15.

Furthermore, a front surface 17a of the extended portion 17 which is on the same side as the one end surface of the mounting portion 13 where is in opposite to the recessed portion 16 is flatly formed so that the front surface 17a is flush with the one end surface of the mounting portion 13.

As shown in FIG. 3, the terminal portion 18 is formed such that after a plate made of a conductive material such as a metal is subjected to pressing, respective portions are bent. The terminal portion 18 is thereby formed in a shape so that the terminal portion 18 is disposed to extend from the front surface 17a of the extended portion 17 through a rear surface 17b thereof, and further from the rear surface 17b of the extended portion 17 through a mounting side surface 13b of the mounting portion 13.

The terminal portion 18 is adapted to be integrally attached to the mounting portion 13 in a manner that a pair of holes 18a provided in each extended portion formed on both of side portions of the terminal portion 18 are respectively engaged with a pair of projections 13d formed on a pair of side surfaces of the mounting portion 13, and a hole 18b provided in an extended portion formed on a rear end portion of the terminal portion 18 is engaged with a projection 13e formed in the center of the other end surface of the trunk portion 14. The surface of the terminal portion 18 disposed on the front surface 17a of the extended portion 17 is formed as a terminal surface 18c.

Next, with reference to FIGS. 4 to 8, a description will be given of a portable telephone 20 having the terminals 10 shown in FIGS. 1 to 3.

Figure 8:
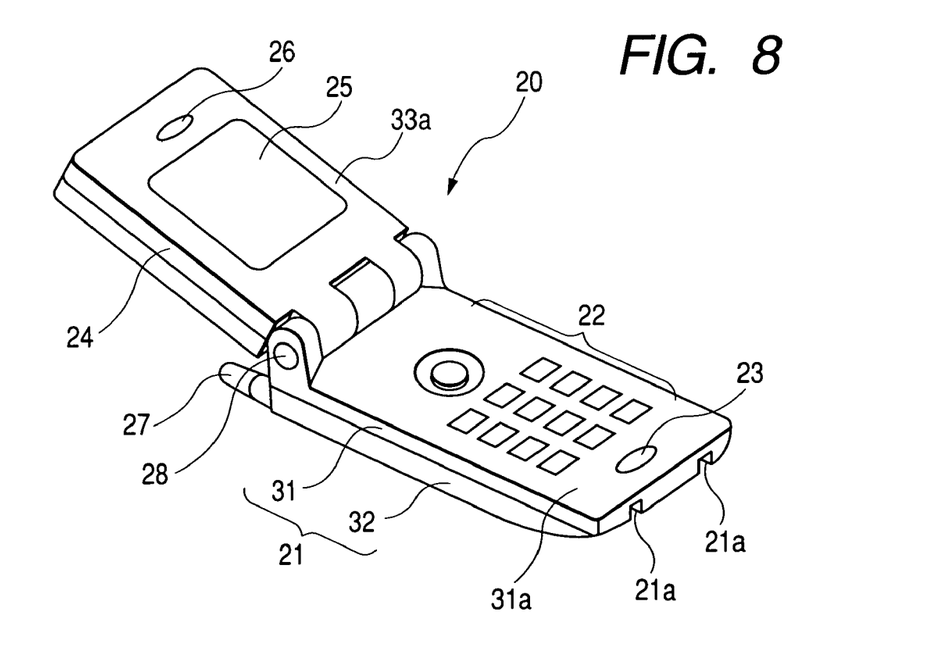
FIG. 8 is a perspective view illustrating a portable telephone which is one example of the portable device having the terminal in accordance with the invention.

The portable telephone 20 has two housings 21 and 24 and a hinge portion 28 for foldably connecting these two housings 21 and 24. As shown in FIG. 8, an operating portion 22 including a plurality of keys and a microphone 23 are provided on an opposing surface 31a of the housing 21 when both housings 21 and 24 are folded, and a display portion 25 and a speaker 26 are provided on an opposing surface 33a of the housing 24 when both housings 21 and 24 are folded.

An antenna 27 is provided on an end face on the side of the hinge portion 28 of the housing 21. It is possible to make a call or send or receive e-mail or the like with the antenna 27 by communicating with a nearby base station.

An unillustrated battery, a circuit board 41, and the like are provided within the housing 21. A pair of openings 21a are provided at an end face (one end face) which is located away from the hinge portion 28. The terminal surface 18c of the terminal 10 for supplying electric power from the electrode of the charger to the battery is exposed in each opening 21a.

An outer surface 32a, of the end portion (one end portion) of the housing 21 located away from the hinge portion 28, opposing to the opposing surface 31a is formed in the shape of a curved surface so as to be tapered toward the one end face of the housing 21.

Figure 4:
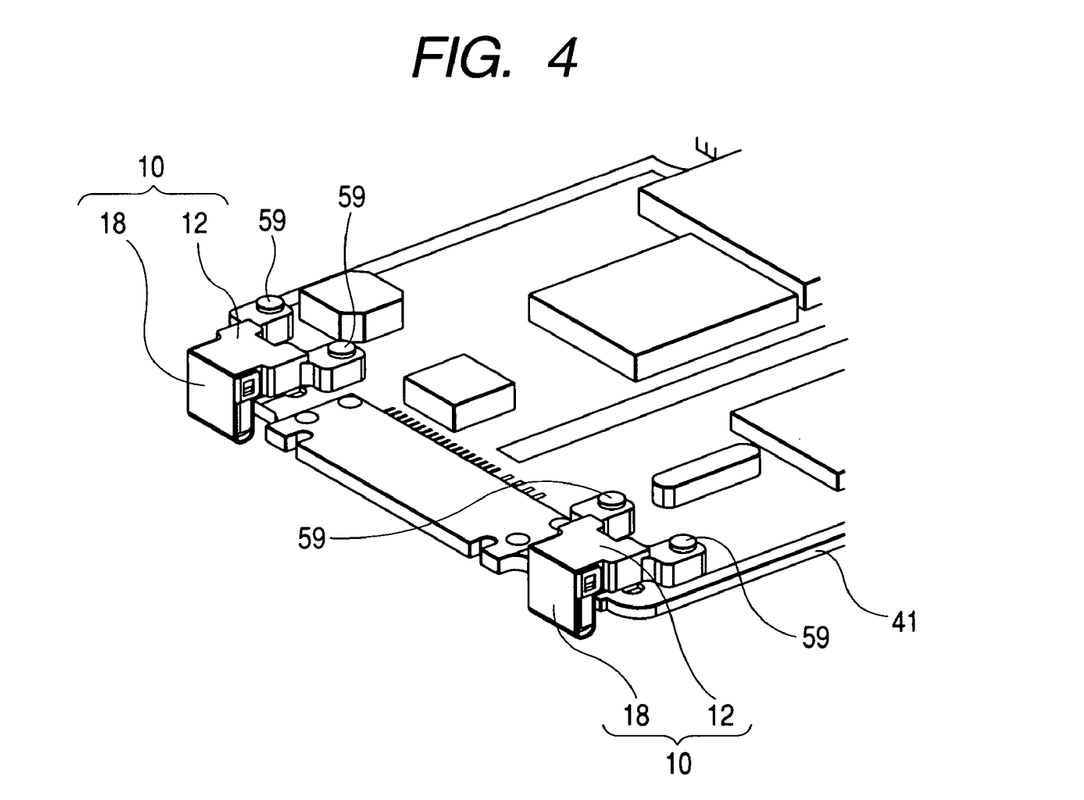
FIG. 4 is a perspective view illustrating a state in which the terminal shown in FIG. 1 is disposed on a circuit board inside a portable device.

The pair of terminals 10 are mounted on the circuit board 41 accommodated in the housing 21, and are respectively disposed on left and right sides of an interface connector 55 disposed at one end portion of the circuit board 41.

Figure 5:
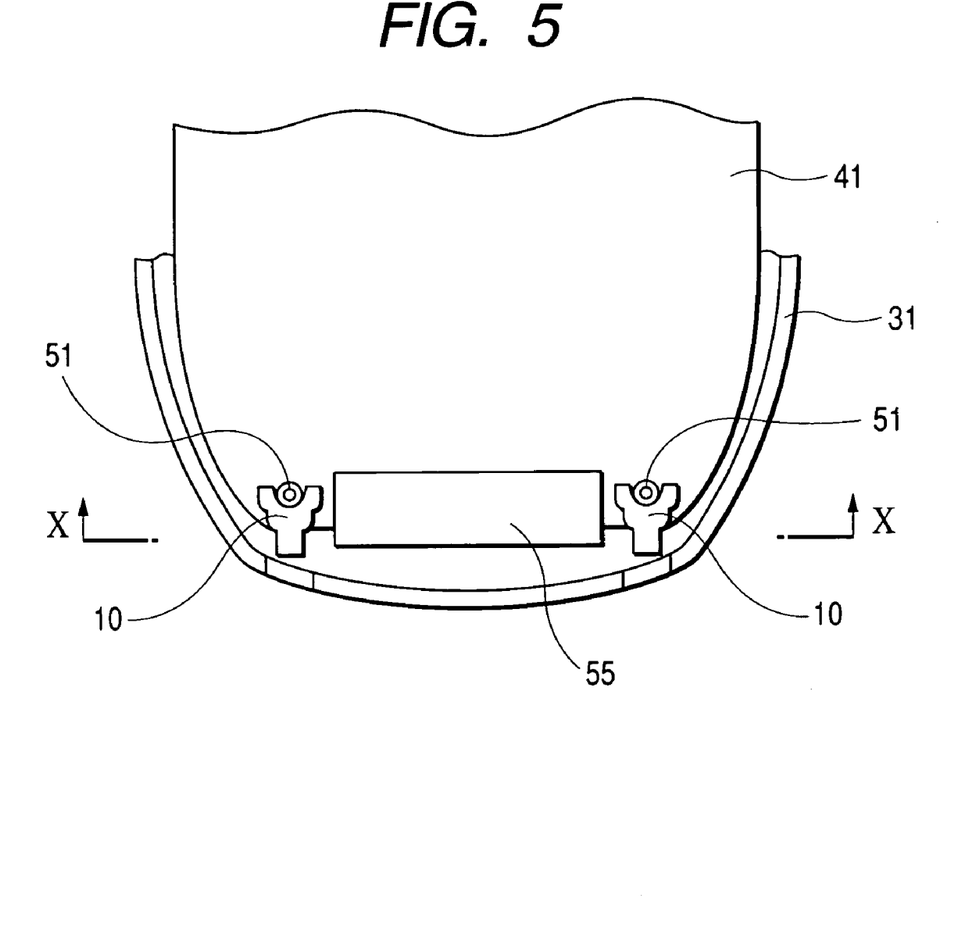
FIG. 5 is a plan view illustrating a state in which the circuit board shown in FIG. 4 is accommodated in a housing of the portable device.

A pair of holes 42 are respectively provided in the vicinity of corners on the one end portion side of the circuit board 41. As a pair of bosses 51 provided on an upper casing 31 for forming the housing 21 are inserted in these holes 42, the circuit board 41 is positioned and accommodated within the upper casing 31. Further, a lower casing 32 for forming the housing 21 is fitted over the upper casing 31. Then, as screws 58 are threadedly inserted into the bosses 51, the upper casing 31 and the lower casing 32 are integrated to form the housing 21.

Figure 6:
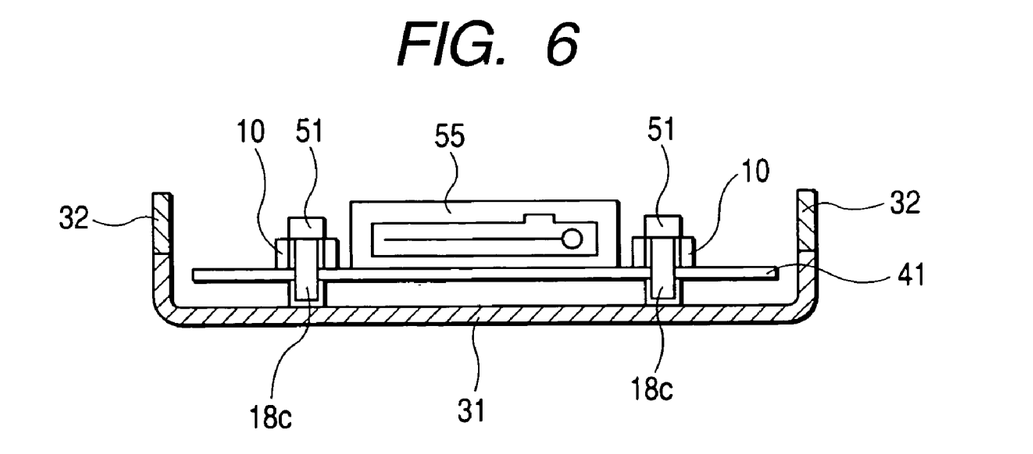
FIG. 6 is a cross-sectional view taken along line X—X in FIG. 5.
Figure 7:
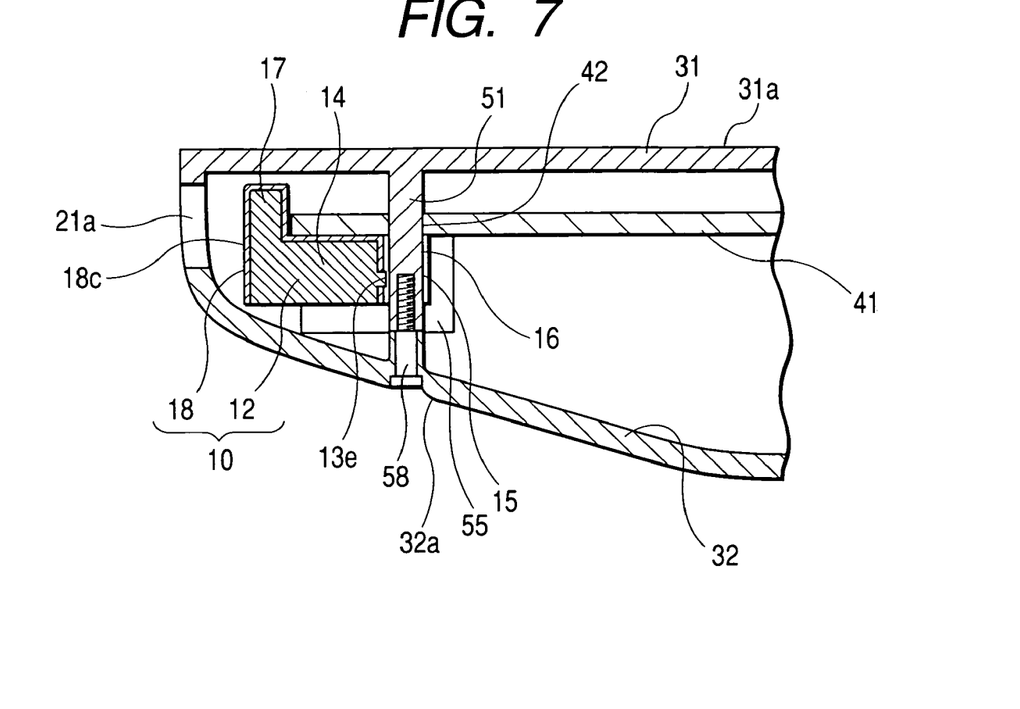
FIG. 7 is a cross-sectional view illustrating a state in which the circuit board shown in FIG. 4 is accommodated in the housing of the portable device.

A conductive pattern is formed on the circuit board 41 around each hole 42 on the side surface (mounting surface) of the lower casing 32. The terminal 10 is mounted on the circuit board 41 such that its mounting side surface 13b is abutted on the conductive pattern, and the extended portion 17 of the terminal 10 extends toward the surface side of the circuit board 41 which is located away from its mounting surface, i.e., toward the opposing surface 31a side of the housing 21. In mounting, a pin 59 is inserted in the pin hole 13c of the terminal 10, and the pin 59 is joined to the circuit board 41 by soldering, thereby effecting the mounting.

According to the embodiment, the terminal 10 has the base portion 12 including the mounting portion 13 to be mounted on the circuit board 41 and the extended portion 17 extending from the one end portion of the mounting portion 13 toward the mounting surface side of the circuit board 41, and the terminal portion 18 made of a conductive material and formed to extend from the front surface 17a of the extended portion 17 which is flush with the one end face of the mounting portion 13 through the mounting side surface of the mounting portion 13. Therefore, the area of the front surface 17a of the extended portion 17 can be made large, and the area of the terminal surface 18c disposed on this front surface 17c can also be made large. As a result, the terminal surface 18c can be reliably abutted on the electrode of an external device such as the charger.

In addition, as for the terminal 10, only the mounting portion 13 is mounted on the circuit board 41, and the extended portion 17 is projected toward the surface side of the circuit board 41 which is located away from its mounting surface. Therefore, the thickness of the mounting portion 13 can be decreased without making the size of the terminal surface 18c small. In addition, even if the terminal surface 18c (extended portion 17) is pressed at the time of connection to an external device, the circuit board 41 is located in its rear, so that the one end face of the circuit board 41 supports the extended portion 17 and is capable of preventing the deformation of the extended portion 17. Therefore, it is possible to reduce the stress applied to a root portion between the extended portion 17 and the mounting portion 13, thereby preventing the breakage of the terminal 10.

Further, in the mounting of the terminal 10 in the portable telephone 20, since the extended portion 17 of the terminal 10 is extended toward the opposing surface 31a side of the housing 21, the thickness of the mounting portion 13 can be decreased. Since the thickness of this mounting portion 13 can be decreased, the terminal 10 can be disposed even if the outer surface 32a of the housing 21 opposing the mounting surface of the circuit board 41 is curved, and the one end portion of the housing 21 is formed in a tapered manner. Moreover, since the terminal 10 can be disposed separately from the interface connector 55, it is possible to enhance the flexibility in design in response to various demands in design.

In addition, since the shape of the terminal 10 can be made common, it is possible to lower the cost of the portable telephone 20.

Although, in the embodiment, the base portion 12 and the terminal portion 18 which configure the terminal 10 are formed separately, the terminal portion 18 and the base portion 12 may be molded integrally by insert molding. Further, in the embodiment, although the front surface 17a of the extended portion 17 and the one end surface of the mounting portion 13 are covered by the terminal portion 18, at least the front surface 17a may be covered by the terminal portion 18. It goes without saying that the invention is applicable to other terminals in which improvements or design changes are made within the scope that does not depart from the gist of the invention.

Although, in the embodiment, the portable telephone 20 is cited as an example, the invention is applicable to other portable devices such as a PDA, a laptop computer or the like.

What is claimed is:

1. A terminal to be mounted in an opening of a portable device, comprising:
   a base portion including a mounting portion to be mounted on a circuit board disposed in the portable device, and an extended portion extending from one end portion of the mounting portion toward a mounting surface side of the circuit board and having a front surface which is flush with one end face of the mounting portion; and
   a terminal portion possessing electrical conductivity and attached to the base portion from at least the front surface of the extended portion through a mounting surface of the mounting portion.

2. A portable device comprising:
   a housing having an opening in one face thereof;
   a circuit board disposed in the housing; and
   a terminal mounted on the circuit board and exposed from the opening,
   wherein the terminal includes;
   a base portion including a mounting portion mounted on the circuit board, and an extended portion extending from one end portion of the mounting portion toward a mounting surface side of the circuit board and having a front surface which is flush with one end face of the mounting portion; and
   a terminal portion possessing electrical conductivity and attached to the base portion from at least the front surface of the extended portion through a mounting surface of the mounting portion,
   the terminal is mounted on the circuit board such that a mounting surface of the terminal is abutted on a mounting surface of the circuit board, and the extended portion is projected toward a surface side opposite to the mounting surface of the circuit board.

3. The portable device according to claim 2, wherein a surface, of one portion of the housing, opposing the mounting surface of the circuit board is shaped to be tapered toward one end face of the housing.

4. A terminal comprising:
a base portion including a mounting portion having a mounting surface to be mounted on a circuit board, and an extended portion extending from one end portion of the mounting portion toward a side of the mounting surface and having a front surface which forms a same surface as one end face of the mounting portion; and
a terminal portion possessing electrical conductivity and attached to the base portion from at least the front surface of the extended portion through a mounting surface of the mounting portion.

5. The terminal according to claim 4, wherein the mounting portion has branch portions at each corner of another end portion of the mounting portion, and the mounting portion is formed substantially in a Y-shape in a plane view.

6. The terminal according to claim 4, wherein the terminal is formed in a symmetrical shape.

7. The terminal according to claim 4,
wherein the terminal portion is formed along the front surface of the extended portion and along the mounting surface of the mounting portion thereon so as to be pressed against a surface of the circuit board.

8. A portable device comprising:
a housing having an opening in one face thereof;
a circuit board disposed in the housing; and
a terminal mounted on the circuit board and exposed from the opening,
wherein the terminal includes:
a base portion including a mounting portion having a mounting surface to be mounted on the circuit board, and an extended portion extending to be projected from one end portion of the mounting portion toward a side of the mounting surface and having a front surface which forms a same surface as one end face of the mounting portion; and
a terminal portion possessing electrical conductivity and attached to the base portion from at least the front surface of the extended portion through a mounting surface of the mounting portion,
the terminal is mounted on the circuit board such that the mounting surface of the terminal is abutted on a mounting surface provided at an edge portion of the circuit board, and the extended portion of the terminal is projected toward a surface side opposite to the mounting surface of the circuit board.

9. The portable device according to claim 8, wherein a surface of the terminal disposed on a surface formed from the one end portion of the mounting portion and the front surface of the extended portion is exposed from the opening.

10. The portable device according to claim 8, wherein a surface, of one portion of the housing, opposing the mounting surface of the circuit board is shaped to be tapered toward one end face of the housing.

11. The portable device according to claim 8, wherein the mounting portion has branch portions at each corner of another end portion of the mounting portion, and a boss of the housing is disposed between the branch portions.

12. The portable device according to claim 8, wherein the terminal is formed in a symmetrical shape.

* * * * *